UNITED STATES PATENT OFFICE.

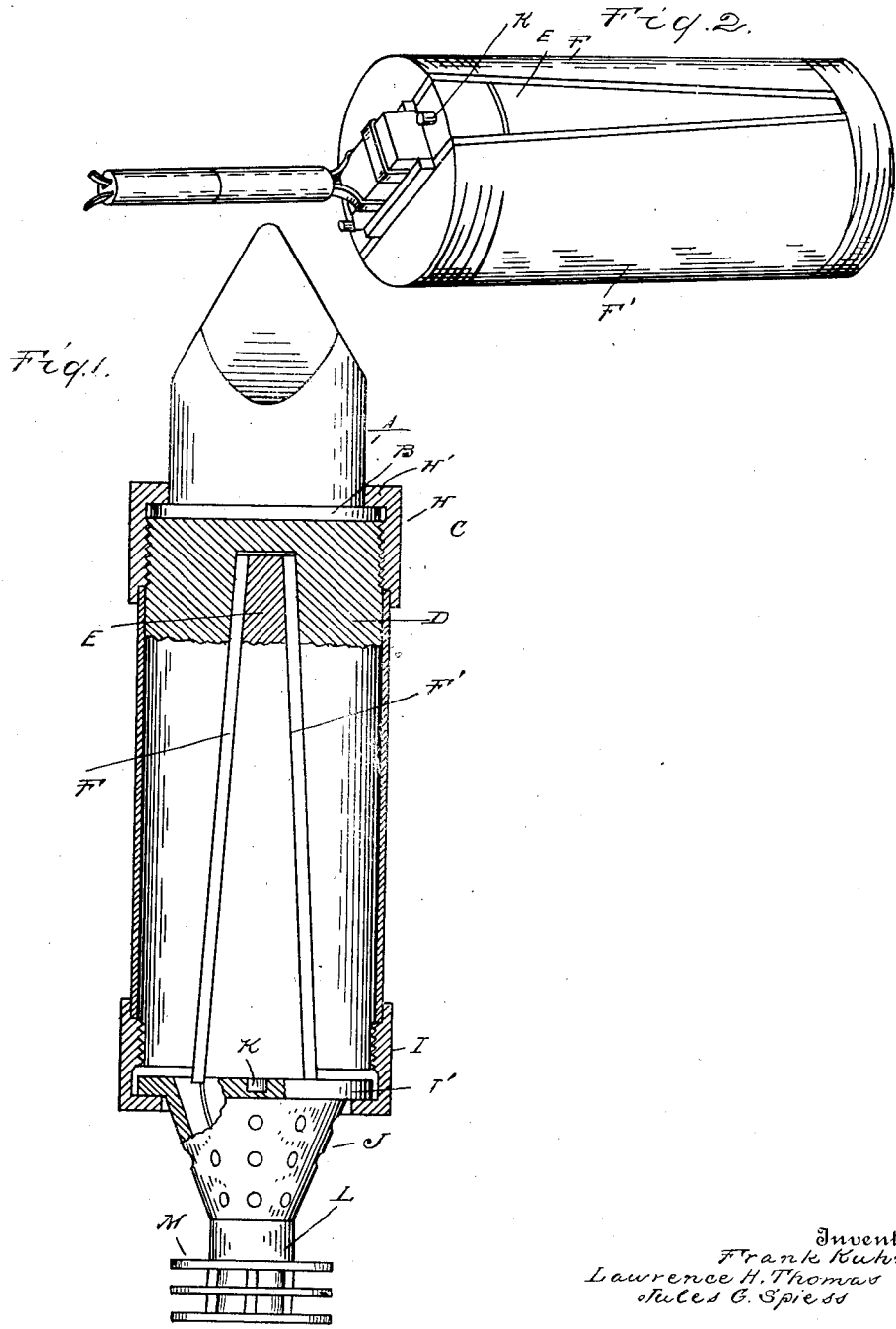

FRANK KUHN, LAWRENCE H. THOMAS, AND JULES G. SPIESS, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRICALLY-HEATED TOOL.

1,363,474.      Specification of Letters Patent.      Patented Dec. 28, 1920.

Application filed May 27, 1920. Serial No. 384,513.

*To all whom it may concern:*

Be it known that we, FRANK KUHN and LAWRENCE H. THOMAS, both citizens of the United States of America, and JULES G. SPIESS, a citizen of the Republic of France, having taken out first citizenship papers in the United States of America, all residing at Detroit, in the county of Wayne and State of Michigan, have invented certain new and useful Improvements in Electrically-Heated Tools, of which the following is a specification, reference being had therein to the accompanying drawing.

The invention relates to electrically heated tools more particularly designed for use in connection with soldering irons and consists in the construction as hereinafter set forth.

In the drawings:

Figure 1 is a sectional elevation of the tool;

Fig. 2 is a perspective view of the heat conducting body and heating unit detached.

A is the tool to be heated, which at its rear end is formed with a flange or shoulder B and a flat face C at its end in a plane perpendicular to the longitudinal axis. D is a cylindrical heat-conducting body having a flat end in contact with the surface B. The central portion of this body is cut away to form a wedge-shaped recess extending longitudinally and with its large end at the rear. E is a wedge for insertion in the recess, and F and F' are a pair of heating units arranged on opposite sides of the wedge and clamped thereby into contact with the body D. The arrangement is such that the electric current passing through the heating units does not pass through the wedge. H is a clamping collar having a threaded engagement with the outer end of the body D and having a flange H' for engaging the flange B of the tool A. I is a clamping collar having a threaded engagement with the rear end of the body D. J is a hollow member bearing against the rear end of the wedge E and held from rotation relative thereto by pins K. The member J is provided with a shank L for attachment to the handle and a series of heat radiating fins M preferably surround said shank and serve to dissipate the heat conducted rearward from the body D. The collar I engages a flange J' of the member J so that by screwing up said collar, said member J will force the wedge E forward, thereby clamping the units F and F' against the body D.

What we claim as our invention is:

1. The combination with a tool to be heated, of a heat conducting body extending rearward therefrom, said tool and body being provided with parallel contacting end surfaces, and said body having a central longitudinally extending wedge-shaped recess, a pair of heating units within said wedge-shaped recess adjacent to the opposite sides thereof, a wedge between said heating units, means for clamping said tool to said body, and connecting means between said body and wedge for adjusting the latter to clamp both of said units in heat conducting contact with the body.

2. The combination with a tool to be heated, of a heat conducting body having an end surface parallel to and in contact with an end surface on said tool, said body being provided with a plurality of longitudinally extending flat surfaces, a corresponding number of flat heating units engaging said flat surfaces, clamping means for holding said heating units in contact with said surfaces, and independent clamping means for holding said body in contact with the surface of said tool whereby the tool can be changed without disturbing the unit.

3. The combination with a tool to be heated, of a heat conducting body of cylindrical form having an end surface parallel and in contact with an end surface of said tool and centrally cut away to provide a wedge shaped recess with flat surfaces on opposite sides thereof, a pair of flat heating units in contact with the opposite sides of said recess, a wedge-shaped member between said units, means for adjusting said wedge-shaped member longitudinally to clamp said units, and means for clamping said body to said tool to hold the parallel surfaces thereof in contact.

4. The combination with a tool to be heated, of a heat conducting body extending rearward from said tool and provided with an end surface parallel to and contacting with an end surface on said tool, said body having a central longitudinally extending recess, a wedge member for fitting within said recess, a pair of heating units mounted upon opposite sides of said wedge member, means for detachably clamping said tool to said heat conducting body, and means for adjusting said wedge in relation of said body to clamp said heating units in heat conducting contact therewith.

5. The combination with a tool to be heated, of a heat conducting body having an end thereof parallel to and abutting against an end of said tool, means for detachably clamping said tool to said body, said body having a central longitudinally extending wedge-shaped recess, a wedge for engaging said recess, a pair of heating units mounted on opposite sides of said wedge and insertible therewith into said recess, a collar having a threaded engagement with said body, a handled shank member clamped to said body by said collar, said shank member bearing against said wedge to simultaneously clamp said wedge and heating units to said body.

6. The combination with a tool to be heated, of a heat conducting body having a detachable end engagement with said tool, said body having a central longitudinally extending recess of wedge-shaped form, a wedge for engaging said recess, a pair of heating units on opposite faces of said wedge and clamped thereby in contact with the corresponding surfaces of said body, a hollow handled shank for said body, means connecting said shank and body for pressing the former against said wedge and clamping the same to the body, and means for dissipating the heat conducted into said shank from said heating units.

In testimony whereof we affix our signatures.

FRANK KUHN.
LAWRENCE H. THOMAS.
JULES G. SPIESS.